(12) United States Patent
Jeon et al.

(10) Patent No.: US 11,676,463 B2
(45) Date of Patent: Jun. 13, 2023

(54) DOORBELL SYSTEM AND SECURITY METHOD THEREOF

(71) Applicant: Hanwha Techwin Co., Ltd., Seongnam-si (KR)

(72) Inventors: Ki Yong Jeon, Seongnam-si (KR); Tak Won Cho, Seongnam-si (KR); Seok Yong Yoon, Seongnam-si (KR); Hee Kyung Kim, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 122 days.

(21) Appl. No.: 16/042,301

(22) Filed: Jul. 23, 2018

(65) Prior Publication Data
US 2019/0066470 A1 Feb. 28, 2019

(30) Foreign Application Priority Data

Aug. 31, 2017 (KR) .................. 10-2017-0111050

(51) Int. Cl.
*G08B 13/196* (2006.01)
*H04N 7/18* (2006.01)
(Continued)

(52) U.S. Cl.
CPC ....... *G08B 13/19602* (2013.01); *G06V 20/52* (2022.01); *G06V 40/103* (2022.01);
(Continued)

(58) Field of Classification Search
CPC .............. G08B 13/19602; G08B 1/08; G08B 13/19663; G08B 13/19669;
(Continued)

(56) References Cited

U.S. PATENT DOCUMENTS

2015/0156031 A1* 6/2015 Fadell ................ H04L 12/2816
700/276
2016/0203370 A1 7/2016 Child et al.
(Continued)

FOREIGN PATENT DOCUMENTS

CA 2557747 A1 2/2008
KR 10-0809044 B1 3/2008
(Continued)

OTHER PUBLICATIONS

KR Office action dated Jul. 6, 2021 for KR patent application No. KR10-2017-0111050.

*Primary Examiner* — Tat C Chio
(74) *Attorney, Agent, or Firm* — McLean IP Global; Jason Y. Pahng

(57) ABSTRACT

Provided are a doorbell system and a method of operating the same. The doorbell system includes a doorbell which includes: a camera configured to obtain at least one of an image of a first object in a first region and an image of a second object in a second region closer to the doorbell than the first region; an image processor configured to detect the first object from the image of the first object, and identify the second object from the image of the second object; and an alert generator configured to select and transmit to a user terminal an alert sound or alert sound information corresponding to the identified second object.

16 Claims, 6 Drawing Sheets

(51) Int. Cl.
*G08B 1/08* (2006.01)
*G06V 20/52* (2022.01)
*G06V 40/10* (2022.01)
*G06V 40/16* (2022.01)

(52) U.S. Cl.
CPC ......... *G08B 1/08* (2013.01); *G08B 13/19663* (2013.01); *G08B 13/19669* (2013.01); *H04N 7/183* (2013.01); *H04N 7/186* (2013.01); *G06V 40/172* (2022.01); *G08B 13/19613* (2013.01); *G08B 13/19652* (2013.01); *G08B 13/19684* (2013.01)

(58) Field of Classification Search
CPC ........ G08B 13/19613; G08B 13/19652; G08B 13/19684; G06K 9/00369; G06K 9/00771; G06K 9/00288; H04N 7/183; H04N 7/186
See application file for complete search history.

(56) References Cited

U.S. PATENT DOCUMENTS

2018/0157915 A1* 6/2018 Sherry ............... G06K 9/00771
2018/0349684 A1* 12/2018 Bapat ............... G08B 13/19645

FOREIGN PATENT DOCUMENTS

| KR | 10-2008-0097849 A | 11/2008 |
| KR | 2016-0018939 A | 2/2016 |
| KR | 10-2017-0032657 A | 3/2017 |
| WO | 2016/196025 A1 | 12/2016 |
| WO | 2017/047976 A1 | 3/2017 |

* cited by examiner

DOORBELL SYSTEM AND SECURITY METHOD THEREOF

CROSS-REFERENCE TO THE RELATED APPLICATION

This application claims priority from Korean Patent Application No. 10-2017-0111050, filed on Aug. 31, 2017, in the Korean Intellectual Property Office, the disclosure of which is incorporated herein in its entirety by reference.

BACKGROUND

1. Field

Apparatuses and methods consistent with the exemplary embodiments relate to a doorbell system and a security method thereof.

2. Description of the Related Art

A doorbell is a device for alerting an occupant inside a building to the presence of a visitor by using a sound or an image. A camera may be provided along with the doorbell so that when a visitor presses a button, the occupant checks the environment around a door via an image.

SUMMARY

The exemplary embodiments of the inventive concept include a doorbell system and a security method thereof which may reduce visitor detection errors of a doorbell and may provide visitor information to a user in advance.

Various aspects will be set forth in part in the description which follows and, in part, will be apparent from the description, or may be learned by practice of the presented embodiments.

According to one or more exemplary embodiments, there is provided a doorbell system which may include a doorbell, wherein the doorbell includes: a camera configured to obtain at least one of an image of a first object in a first region and an image of a second object in a second region closer to the doorbell than the first region; an image processor configured to detect the first object from the image of the first object, and identify the second object from the image of the second object; and an alert generator configured to select and transmit to a user terminal an alert sound or alert sound information corresponding to the identified second object.

The image processor may be further configured to: detect the first object by applying a first image analysis algorithm to the image of the first object; and identify the second object by applying a second image analysis algorithm, different from the first image analysis algorithm, to the image of the second object.

The doorbell system may further include a storage configured to store at least one of the image of the first object from which the first object is detected and the image of the second object from which the second object is identified.

The doorbell system may further include: a microphone; and a sound processor configured to detect a sound event from a sound received by the microphone, wherein the alert generator is further configured to select and transmit the user terminal an alert sound or alert sound information corresponding to the detected sound event.

The doorbell system may further include a storage configured to store an event image obtained by the camera at a time when the sound event occurs, wherein the alert generator may be further configured to transmit the obtained event image to the user terminal.

The first object and the second object may be the same.

The alert generator may be further configured to select the alert sound set to the identified second object or an alert sound set to a third object related to the second object.

The doorbell system may further include a server configured to receive, from the doorbell, event information according to detection of the first object and identification of the second object, and determine whether a behavior is an abnormal behavior by analyzing behavior patterns of the first object and the second object.

The server may be further configured to generate situation information based on the event information and transmit the situation information to the user terminal, and transmit the event information corresponding to the situation information to the user terminal in response to a request by the user terminal.

The alert generator may be further configured to transmit to the user terminal object information about the identified second object and the alert sound information corresponding to the identified second object.

According to one or more exemplary embodiments, there is provided a doorbell system which may include at least one processor configured to determine an identify of an object in a predetermined region; and transmit, to a user terminal connected to the doorbell system, an alert sound assigned to the identify-determined object from among a plurality of alert sounds, or alert sound information indicating characteristics of the alert sound on a real-time basis, when the identify of the object is determined in the predetermined region.

The processor may transmit, to the user terminal, the alert sound information indicating the characteristics of the alert sound, wherein the characteristics of the alert sound includes at least one of a name, an identifier, and an index of the alert sound previously known between the doorbell and the user terminal.

The processor may be further configured to detect a first object in a first region by determining whether there is a movement of the first object in the first region, and determine an identity of a second object in a second region by determining whether the second object is a registered object. The processor may also be configured not to transmit, to the user terminal, a first alert sound assigned to the first object from among the plurality of alert sounds, or alert sound information indicating characteristics of the first alert sound, when the first object is detected only in the first region among the first region and the second region. However, the processor may be configured to transmit, to the user terminal, a second alert sound assigned to the second object from among the plurality of alert sounds, or alert sound information indicating characteristics of the second alert sound, when the identity of the second object in the second region is determined.

The processor may be further configured to transmit object information about the second object when the identity of the second object in the second region is determined, and configured to transmit object information about the first object when the first object is detected only in the first region among the first region and the second region.

According to one or more embodiments, there is provided a security method of a doorbell system including a doorbell. The method may include: detecting a first object entering a first region, from an image obtained by capturing the first object; identifying a second object entering a second region closer to the doorbell than the first region, from an image obtained by capturing the second object; and outputting an alert sound or alert sound information corresponding to the identified second object.

The detecting the first object and the identifying the second object may include: detecting the first object by applying a first image analysis algorithm to the image of the first object; and identifying the second object by applying a second image analysis algorithm, different from the first image analysis algorithm, to the image of the second object.

The security method may further include transmitting, to a user terminal, object information about the identified second object and the alert sound or the alert sound information corresponding to the identified second object.

The alert sound information corresponding to the identified second object is transmitted to the user terminal may be transmitted to the user terminal, wherein the alert sound information indicates characteristics of the alert sound.

The characteristics of the alert sound may include at least one of a name, an identifier, and an index of the alert sound previously known between the doorbell and the user terminal.

The detecting the first object may include determining whether there is a movement of the first object in the first region, and the identifying the second object comprises determining whether the second object is a registered object.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

The objectives, features, and advantages of the inventive concept will become more apparent by describing in detail exemplary embodiments thereof with reference to the attached drawings. In the description of the exemplary embodiments, certain detailed explanations of related art are omitted when it is deemed that they may unnecessarily obscure the essence of the inventive concept.

It will be further understood that when a part "includes" or "comprises" an element, unless otherwise defined, the part may further include other elements, not excluding the other elements.

As used herein, the term "and/or" includes any and all combinations of one or more of the associated listed items. Expressions such as "at least one of", when preceding a list of elements, modify the entire list of elements and do not modify the individual elements of the list.

The exemplary embodiments will now be described more fully with reference to the accompanying drawings.

Figure 1:
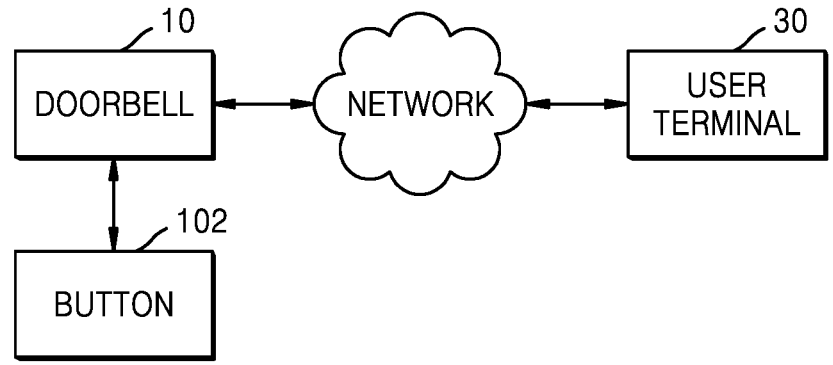
FIGS. 1 and 2 are diagrams illustrating a security system according to an exemplary embodiment.
Figure 2:
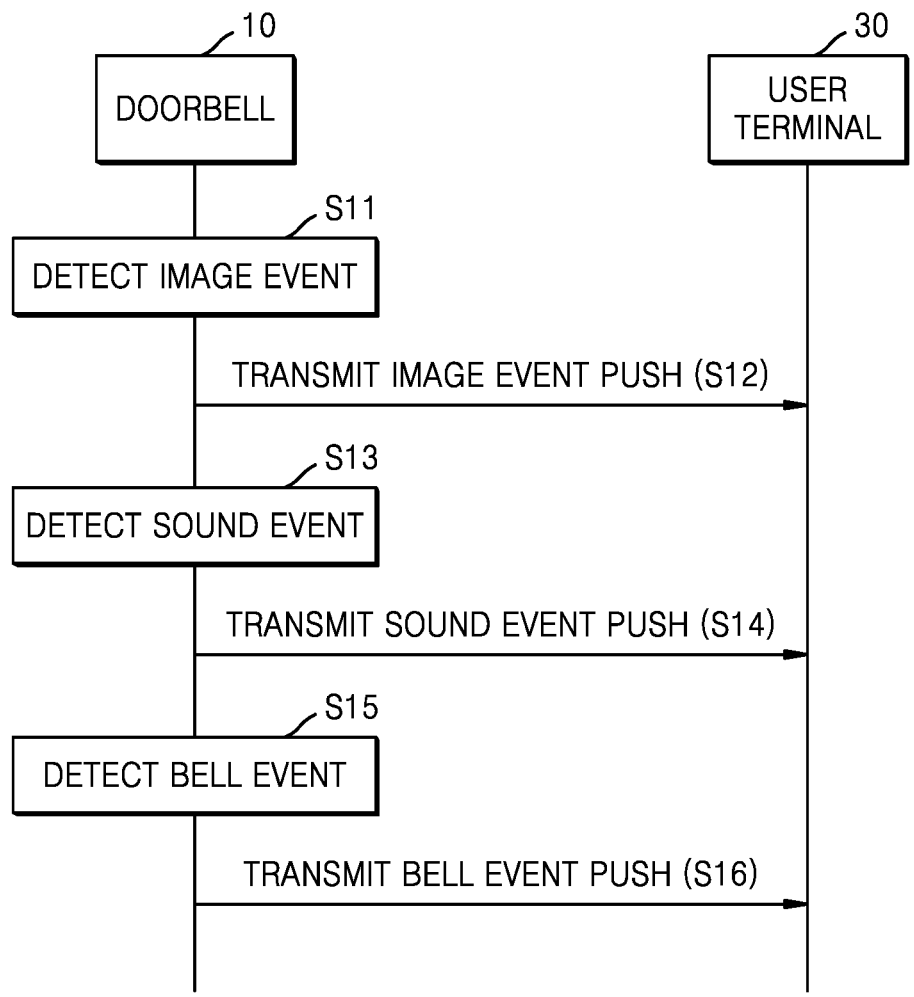

FIGS. 1 and 2 are diagrams illustrating a security system according to an exemplary embodiment.

Referring to FIGS. 1 and 2, the security system may include a doorbell system including a doorbell 10 and a user terminal 30. The doorbell 10 may be connected by wire or wirelessly to the user terminal 30 through a network and may communicate with the user terminal 30.

Examples of the network may include a short-range wireless communication network such as Zigbee, Bluetooth, radio frequency identification (RFID), near-field communication (NFC), or infrared communication, a mobile communication network such as 3G, 4G long-term evolution (LTE), WiFi, wireless broadband (Wibro), or worldwide interoperability for microwave access (Wimax), a wireless Internet communication network, a Sub-1 GHz band communication network, and/or a wired communication network.

The doorbell 10 may be provided outside a door of a building, and when a visitor presses a button 102 provided in a housing of the doorbell 10, an alert sound may be output from a video phone provided inside the door of the building, and a user inside the door of the building may check the visitor by watching the visitor's face and hearing the visitor's voice through the video phone.

The doorbell 10 according to an exemplary embodiment may communicate with the user terminal 30 in real time by using the network, in case the user is not in the building including the doorbell 10 and is in a remote place. Accordingly, when the visitor enters an imaging region of the doorbell 10 or presses the button 102, the doorbell 10 may store an image or may provide an alarm to the user terminal 30 of the user who is absent in the building. Also, the doorbell 10 may provide an alarm in response to a specific sound, and may provide a user automatic recognition function and a sensor interoperation function by using Bluetooth and Sub-1 GHz band communication, not being limited thereto. The doorbell 10 may interoperate with at least one registered user terminal 30 by using wireless communication.

In operation S11, the doorbell 10 may detect an image event from an image obtained by a camera. In an exemplary embodiment, the doorbell 10 may detect and/or identify a visitor by applying two or more different image analysis algorithms to images corresponding to regions.

The doorbell 10 may detect a primary image event that detects, from an image of a first object entering a first region, the first object. The doorbell 10 may detect a secondary image event that identifies, from an image of a second object entering a second region, the second object. The second region may be closer to the doorbell 10 than the first region. The second object entering the second region may be the first object detected in the primary image event, or may be a new object whose entry to the first region is not detected.

In another exemplary embodiment, the doorbell 10 may detect and/or identify the visitor by applying different image analysis algorithms to regions in an image. The doorbell 10 may detect the primary image event that detects a first object entering a region corresponding to the first region, in the image. The doorbell 10 may detect the secondary image event that identifies a second object entering a region corresponding to the second region, in the image.

In operation S13, the doorbell 10 may detect a sound event from a sound obtained by a microphone. The doorbell 10 may detect the sound event by detecting an abnormal sound in surroundings.

When the doorbell 10 detects the image event and/or the sound event, the doorbell 10 may transmit an image event push and/or a sound event push to the user terminal 30 in operation S12 and/or S14. The doorbell 10 may transmit at least one of a corresponding image, information about the identified object and alert sound information corresponding or assigned to each object along with the image and/or sound event push to the user terminal 30. The alert sound information may include alert sound distinction data such as a name, an identifier, and an index of an alert sound previously known between the doorbell 10 and the user terminal 30.

The user terminal 30 may receive the image and/or sound event push, and the user may grasp a situation around the doorbell 10. In an exemplary embodiment, the user terminal 30 may receive the information about the identified object, may select an alert sound from the alert sound information corresponding or assigned to each object stored in the user terminal 30, and may output the selected alert sound corresponding or assigned to the alert sound information. In another exemplary embodiment, the user terminal 30 may receive the alert sound information, and may output an alert sound corresponding or assigned to the received alert sound information. In still another exemplary embodiment, the doorbell 10 may store a plurality of alert sounds at a storage 105 (FIG. 3), select an alert sound corresponding to the identified object, and transmit the selected alert sound or a signal of the selected alert sound to the user terminal 30 so that the user terminal 30 reproduces the selected alert sound.

In operation S15, a bell event (button press event) is detected. In operation S16, the doorbell 10 may transmit a bell event push to the user terminal 30. The user may select an image mode and/or a sound mode in the user terminal 30, and may perform a video call and/or a voice call in real time with the visitor.

Figure 3:
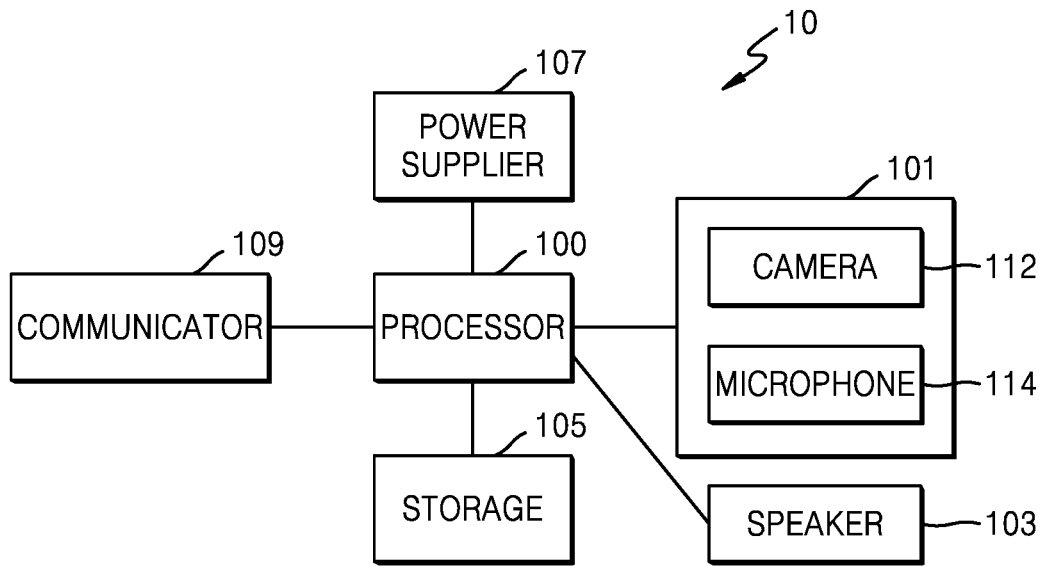
FIGS. 3 and 4 are diagrams illustrating a configuration of a doorbell according to an exemplary embodiment.
Figure 4:
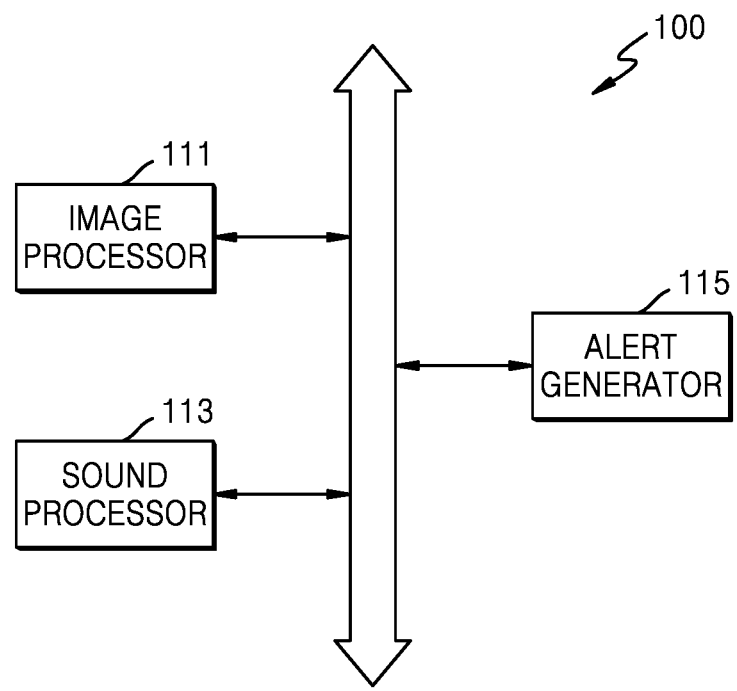

FIGS. 3 and 4 are diagrams illustrating a configuration of the doorbell 10 according to an exemplary embodiment.

Referring to FIG. 3, the doorbell 10 according to an exemplary embodiment may include a processor 100, a sensor assembly 101, a speaker 103, a storage 105, a power supplier 107, and a communication interface or input/output (I/O) interface 109. Here, the communication interface may include any one or any combination of a digital modem, a radio frequency (RF) modem, a WiFi chip, and related software and/or firmware.

The sensor assembly 101 may be embedded in a housing of the doorbell 10, or may include at least one sensor installed outside a door (outdoors) where the doorbell 10 is provided. The at least one sensor may include a camera 112 and a microphone 114.

The camera 112 may include an image sensor, a lens, and a filter. The camera 112 may be embedded in the housing of the doorbell 10 or may be provided outside the door, and may photograph an outdoor situation. The camera 112 may photograph a predetermined region around the doorbell 10.

When an object enters a first region around the doorbell 10 and/or enters a second region, the camera 112 may obtain an image. The second region is closer to the camera 112 (that is, the doorbell 10) than the first region. The first region and the second region may be set according to the performance of the camera 112 and/or external environment.

The first region may be a distance range where a movement of an object can be detected or whether the object is a human can be detected from the image obtained by the camera 112. The second region may be a distance range where the object can be identified through face recognition or the like from the image obtained by the camera 112. For example, the first region may be at a distance of 10 m or 5 m from the camera 112, and the second region may be at a distance of 5 m or 3 m from the camera 112.

The camera 112 may photograph a situation around the doorbell 10 when a sound event is detected from a sound detected by the microphone 114.

The microphone 114 may be embedded in the housing of the doorbell 10 or may be provided outside the door, and may detect an outdoor sound.

The sensor assembly 101 may further include various sensors for detecting an intrusion and/or a danger or an accident, such as a motion sensor, a gas sensor, a temperature sensor, and an illumination sensor.

The speaker 103 may be embedded in the housing of the doorbell 10 or may be provided outside the door, and may output a sound.

The storage 105 may store a program for processing and controlling the processor 100, and may store data (e.g., an image or a sound) that is input or output. The storage 105 may include an external storage medium such as a secure digital (SD) card and/or an internal memory. The storage 105 may include a web storage or a cloud server that performs a storage function on the Internet. A user may access to the storage 105 through the user terminal 30, and may search for and reproduce (or replay) a stored image and/or sound matching a condition such as an event and a time.

The storage 105 may store an alert sound and/or alert sound information corresponding to or assigned to each object. Objects may include registrants and non-registrants of the doorbell 10. The storage 105 may store at least one of an image of a first object entering a first region and an image of a second object entering a second region where an image event occurs. The storage 105 may store a sound of the sound event and an image obtained by the camera 112 in response to the sound event. The power supplier 107 may convert alternating current (AC) or direct current (DC) power applied from an external power source into power required to operate each element and may supply the converted power. The power supplier 107 may include an auxiliary power source such as a rechargeable battery.

The communication interface 109 may perform short-range wireless communication such as Zigbee, Bluetooth, RFID, NFC, or infrared communication, or mobile communication or wireless Internet communication such as 3G, 4G LTE, WiFi, Wibro, or Wimax. Also, the communication interface 109 may perform Sub-1 GHz band communication and/or wired communication. The communication interface 109 may be connected to the user terminal 30 by using wired or wireless communication.

The processor 100 may include any number of hardware and/or software components that perform specific functions. For example, the processor 100 may refer to a hardware-implemented data processing device having circuitry that is physically structured to execute operations represented as code or instructions included in a program.

The processor 100 controls an overall operation of the doorbell 10, and transmits/receives control signals to/from elements to control operations of the elements or processes data.

Referring also to FIG. 4, the processor 100 may include an image processor 111, a sound processor 113, and an alert generator 115.

The image processor 111 may include a video codec, may process the image obtained by the camera 112, and may detect an image event.

In an exemplary embodiment, the image processor 111 may apply a different image analysis algorithm to an image according to a position of an object. The image processor 111 may separately apply an object detection algorithm and an object identification algorithm to an image according to a position of an object. For example, the image processor 111 may apply the object detection algorithm to an image of an object approaching the first region, and may apply the object identification algorithm to an image of an object approaching the second region.

The image processor 111 may detect a first object from an image obtained by photographing a first region around the doorbell 10 by the camera 112. The image processor 111 may detect the first object that enters the first region by applying the object detection algorithm to the image of the first object. The image processor 111 may detect the first object from the image of the first object by using a motion detection (MD) or human detection (HD) algorithm.

Since the HD algorithm detects a shape of a person, the HD algorithm may more reliably detect an event than the MD algorithm that detects, as a motion, even an environmental change such as a change in a tree branch due to wind or a change in illumination as well as a movement of a person.

When the second object enters the second region, the image processor 111 may identify the second object from the image of the second object obtained by photographing the second region around the doorbell 10 by the camera 112. The image processor 111 may identify the second object that enters the second region by applying the motion identification algorithm to the image of the second object. The image processor 111 may identify the second object by using a face recognition (FR) algorithm. The image processor 111 may determine whether the identified object is a registered object or a non-registered object by comparing a face pattern of the identified object with a face pattern that is pre-registered (pre-stored).

In another exemplary embodiment, the image processor 111 may separately apply the object detection algorithm and the object identification algorithm according to regions of an image. For example, when the image of the first object and/or the image of the second object includes a region corresponding to the first region and/or a region corresponding to the second region, the image processor 111 may apply the object detection algorithm to the region corresponding to the first region and may apply the object identification algorithm to the region corresponding to the second region, in the images of the first object and/or the image of the second object.

According to exemplary embodiments, since an object is primarily detected and then the object is secondarily identified, accuracy may be increased, a false alert rate may be reduced, and detailed information about a visitor may be transmitted to the user. Also, according to exemplary embodiments, since only the second object of the second region is identified, unnecessary personal information may not need to be generated and/or stored, and unnecessary system resource consumption may be reduced.

The image processor 111 may store, in the storage 105, the image of the first object and the image of the second object respectively obtained when the first object enters the first region and the second object enters the second region. The image processor 111 may store the two images by matching an object entry time to each image.

The image processor 111 may collect a result of object detection from the first region and object identification from the second region as statistics, and may adjust a range (or a distance) of the first region and the second region based on the statistics.

The sound processor 113 may include an audio codec, and may process a sound received through the microphone 114.

The sound processor 113 may detect a sound event set by a user, for example, an event where a glass cracking sound, an alarm sound, a collision sound, a shout, a scream, a crying sound, or a sound greater than a threshold value occurs is produced, from the received sound.

The sound processor 113 may store, in the storage 105, an image obtained when the sound event is detected. The sound processor 113 may store the this image by matching a sound event detection time and a sound to each image.

The alert generator 115 may select an alert sound from a plurality of alert sounds stored in the storage 105 when the image processor 111 detects an image event, for example, identifies an object. The alert sound may be set to each registrant, for example, an alert sound corresponding to a first registrant or an alert sound corresponding to a second registrant. Registrants may include family members, acquaintances, and previous visitors. The user may define a name of each registrant, and may set a different alert sound to each registrant. Also, the user may set an alert sound corresponding or assigned to a non-registrant. The user may relate two or more registrants. For example, the user may correlate the family members, or may correlate two or more (e.g., parents) of the family members. The alert generator 115 may select an alert sound corresponding to the identified object. The alert generator 115 may select an alert sound set to the identified object or an alert sound set to another object related to the identified object. For example, when the identified object is the mother, the alert generator 115 may select an alert sound set to the mother and/or an alert sound set to the father related to the mother.

According to exemplary embodiments, since a different alert sound is set to each registrant, before the visitor presses the button 102, the user carrying the user terminal 30 may individually know whether the visitor is a family member, a previous visitor, or a new visitor. Accordingly, the user may rapidly perform a follow-up action on the visitor.

The alert generator 115 may select an alert sound when the sound processor 113 detects a sound event. The alert sound may be set to vary according to a type of the sound event.

The alert sound selected by the alert generator 115 may be output through the speaker 103 to the outside. Also, the alert generator 115 may transmit alert sound information corresponding to the selected alert sound to the user terminal 30 at a remote place through the communication interface 109. The user terminal 30 may output an alert sound to the user based on the alert sound information.

The alert generator 115 may transmit at least one of image event information (e.g., a corresponding image, information about an identified object, information about a visitor or so on) and alert sound information to the user terminal 30 when an image event is detected. The alert generator 115 may transmit at least one of sound event information (e.g., a corresponding image and/or a corresponding sound) and alert sound information to the user terminal 30 when the sound event is detected.

Figure 5:
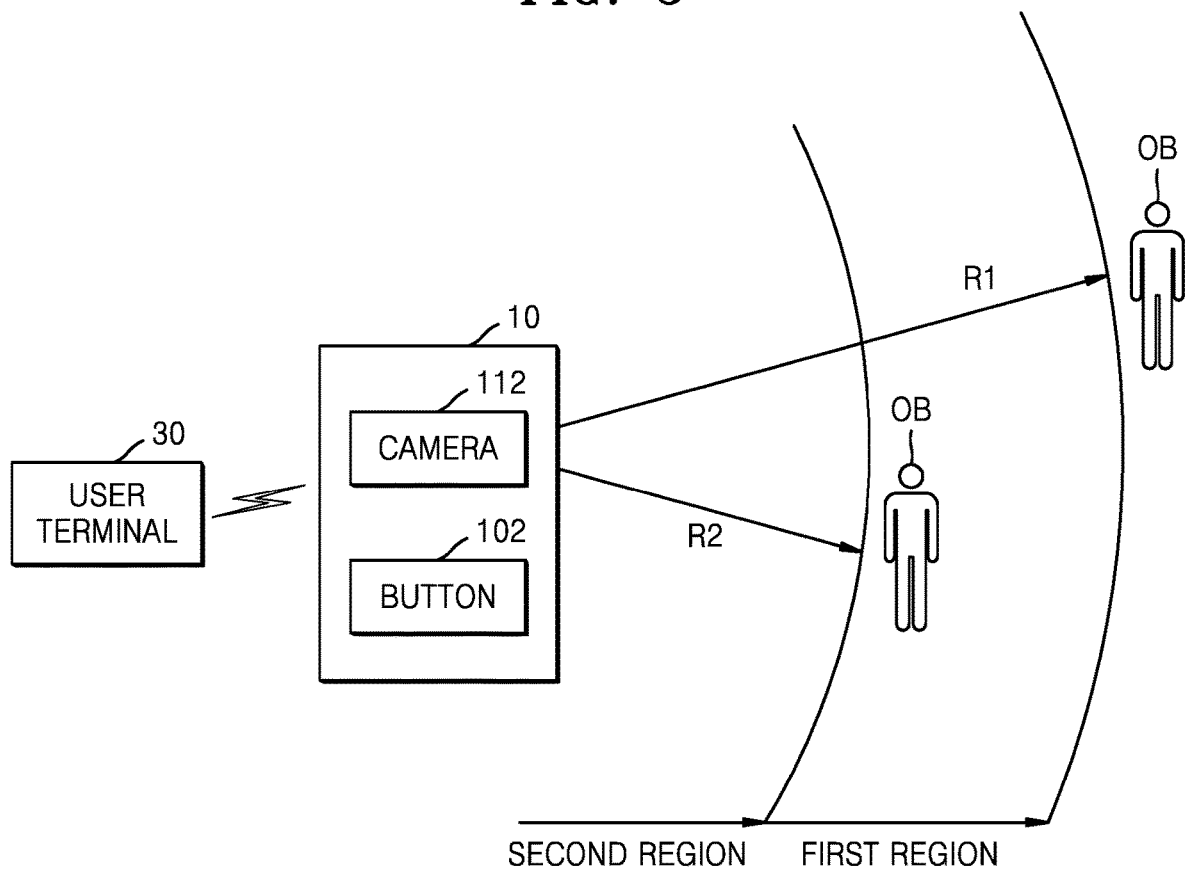
FIG. 5 is a diagram for explaining an example where an image event is detected, according to an exemplary embodiment.

FIG. 5 is a diagram for explaining an example where an image event is detected according to an exemplary embodiment.

Referring to FIGS. 4 and 5 together, the camera 112 of the doorbell 10 may obtain an image by imaging a first object OB that enters a first region of a first distance R1 at a first time t1.

When the image processor 111 detects the first object OB1 from the image of the first object by using an object detection algorithm, the alert generator 115 may transmit a primary image event push to the user terminal 30 through the communication interface 109. The alert generator 115 may transmit the image of the first object along with the primary image event push to the user terminal 30.

The camera 112 of the doorbell 10 may obtain an image by imaging a second object OB2 that enters a second region of a second distance R2 at a second time t2. The second object OB2 may be the first object OB1 that is detected in the first region and enters the second region, an object that directly enters the second region without passing through the first region, or an object that passes through the first region and is not detected.

When the image processor 111 identifies the second object OB2 from the image of the second object by using an object identification algorithm, the alert generator 115 may transmit a secondary image event push to the user terminal 30 through the communication interface 109. The alert generator 115 may transmit the image of the second object along with the secondary image event push to the user terminal 30. The alert generator 115 may further transmit at least one of information about the identified second object OB2 and an alert sound or alert sound information set to the identified second object OB2 along with the image of the identified second object OB2 or separately to the user terminal 30. The information about the identified second object OB2 may be an image or text, or metadata about the identified object OB2.

The user terminal 30 may select and output a corresponding alert sound based on the information about the identified second object OB2 and/or the alert sound information.

In an exemplary embodiment, the user terminal 30 may select and output an alert sound corresponding to the information about the identified second object OB2 (i.e., visitor information) received from the doorbell 10, based on a registrant-alert sound relationship (table) and a plurality of alert sounds stored in the user terminal 30. For example, the alert generator 115 may transmit object information indicating that the identified second object OB2 is a first registrant to the user terminal 30. The user terminal 30 may select and output an alert sound set to the first registrant from the stored registrant-alert sound relationship.

In another exemplary embodiment, the user terminal 30 may store a plurality of alert sounds and may select and output an alert sound corresponding to alert sound information received from the doorbell 10. For example, when the identified second object OB2 is the first registrant, the alert generator 115 may transmit alert sound information indicating a first alert sound set to the first registrant to the user terminal 30. Alternatively, when the identified second object OB2 is the first registrant, the alert generator 115 may transmit the alert sound information indicating the first alert sound set to the first registrant or alert sound information indicating a second alert sound set to a second registrant related to the first registrant to the user terminal 30. The user terminal 30 may output the first alert sound or the second alert sound that is previously stored, according to the received alert sound information.

According to exemplary embodiments, the doorbell 10 may transmit visitor information to a user at a remote place before a visitor presses a bell or button 102 of the doorbell 10. The user may obtain reliable event information with a reduced false alert rate and detailed information about the visitor in advance. Accordingly, the user may take a follow-up action on an unwanted visitor or an intruder. Also, the user may take a necessary action on an expected visitor.

When the visitor presses the button 102 of the doorbell 10, the doorbell 10 may transmit a bell event push to the user terminal 30 through the communication interface 109. The user may select an image mode and/or a voice mode in the user terminal 30. In the image mode, the user may perform a video call with the visitor in real time. In the voice mode, the user may perform a voice call with the visitor in real time.

In another exemplary embodiment, the camera 112 of the doorbell 10 may obtain an image by simultaneously capturing the first object OB1 that enters the first region of the first distance R1 and the second object OB2 that enters the second region of the second distance R2, at a third time t3. The first object OB1 that enters the first region and the second object OB2 that enters the second region may be different from each other.

Figure 6:
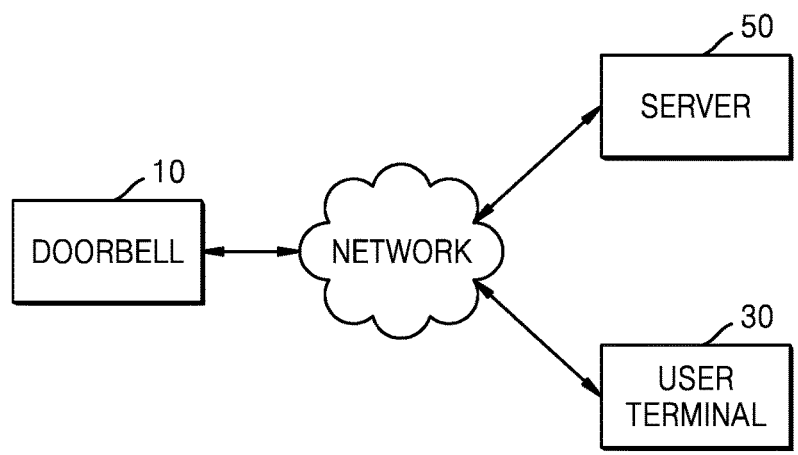
FIGS. 6 and 7 are diagrams illustrating a security system according to another exemplary embodiment.
Figure 7:
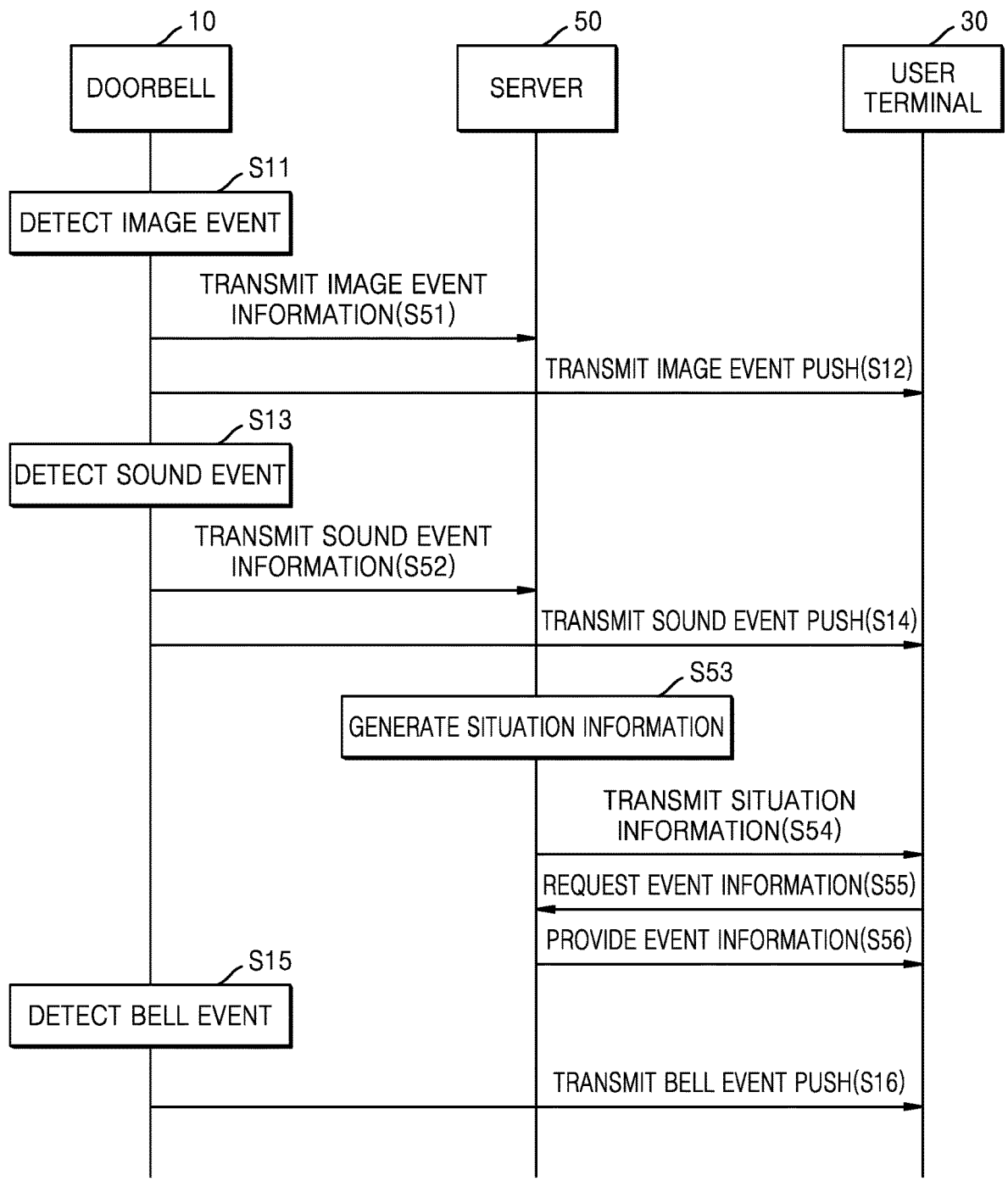

The image processor 111 may detect the object OB1 that enters the first region by applying the object detection algorithm to a region corresponding to the first region of the image of the first object OB1, and may identify the second object OB2 that enters the second region by applying the object identification algorithm to a region corresponding to the second region of the image of the second object OB2. The image processor 111 may store the image of the first object OB1 that enters the first region and the image of the second object OB2 that enters the second region. The alert generator 115 may transmit an image event push to the user terminal 30 through the communication interface 109. The alert generator 115 may transmit the image of the first object OB1 that enters the first region and the image of the second object OB2 that enters the second region along with the image event push to the user terminal 30. The alert generator 115 may transmit at least one of information about the identified second object OB2 and alert sound information corresponding to the identified second object OB2 to the user terminal 30. FIGS. 6 and 7 are diagrams of a security system according to another exemplary embodiment.

Referring to FIGS. 6 and 7, the security system may include a doorbell system including a doorbell 10, a user terminal 30, and a server 50. The doorbell 10 and the user terminal 30 illustrated in FIGS. 6 and 7 may be the same doorbell 10 and user terminal 30 illustrated in FIGS. 1 and 2. The doorbell 10 may communicate with the user terminal 30 and/or the server 50 by wire or wirelessly through a network. The embodiment of FIG. 6 is different from the embodiment of FIG. 1 in that the server 50 is added. The following will focus on the difference, and a detailed explanation of the same elements will be omitted.

In operation S11, the doorbell 10 may detect an image event from an image obtained by a camera. The doorbell 10 may detect a primary image event that detects a first object entering a first region and a secondary image event that identifies a second object entering a second region.

In operation S13, the doorbell 10 may detect a sound event from a sound obtained by a microphone.

When the image event is detected, in operation S12, the doorbell 10 may transmit an image event push to the user terminal 30. When the sound event is detected, in operation S14, the doorbell 10 may transmit a sound event push to the user terminal 30.

The doorbell 10 may transmit at least one of a corresponding image and alert sound information along with the image event push and/or the sound event push to the user terminal 30. The user terminal 30 may receive the image event push and/or the sound event push and a user may grasp a situation around the doorbell 10.

In operation S15, a bell event (button pressure event) is detected. In operation S16, the doorbell 10 may transmit a bell event push to the user terminal 30. The user may select an image mode and/or a sound mode in the user terminal 30, and may perform a video call and/or a voice call in real time.

When the image event is detected, in operation S51, the doorbell 10 may transmit image event information to the server 50. The image event information may include an event image, an image event occurrence time, etc.

When the sound event is detected, in operation S52, the doorbell 10 may transmit sound event information to the server 50. The sound event information may include a sound detected in the sound event, an image obtained when the sound event is detected, a sound event occurrence time, etc.

In operation S53, the server 50 may generate situation information by collecting and analyzing the image event information and/or the sound event information. In operation S54, the server 50 may transmit the situation information to the user terminal 30. The situation information may be provided as a message (text) suitable for the situation and including words, phrases, and sentences. The server 50 may determine whether a behavior is an abnormal behavior by analyzing a behavior pattern and/or a movement of the first object detected in the first region or the second object identified in the second region, based on the image event information and/or the sound event information. For example, the server 50 may detect a rover who wanders around a building by using the behavior pattern of the first object detected in the first region.

In operation S55, the user terminal 30 may request the server 50 for the image event information and/or the sound event information corresponding to the received situation information.

In operation S56, the server 50 may provide the image event information and/or the sound event information to the user terminal 30 in response to an event information request received from the user terminal 30.

Although the doorbell 10 transmits an alert sound or a signal of the alert sound (e.g., an electrical signal converted from the alert sound), or alert sound information corresponding to the alert sound to the user terminal 30 so that the user terminal 30 outputs the received alert sound or selects an alert sound corresponding to the received alert sound information in the above exemplary embodiments, in another exemplary embodiment, a registrant-alert sound relationship may be defined in the server 50 and the server 50 may select an alert sound based on the image event information and/or the sound event information received from the doorbell 10 and may transmit the selected alert sound to the user terminal 30. Alternatively, the server 50 may transmit object information or alert sound information to the user terminal 30, and the user terminal 30 may select an alert sound, corresponding to the object information or the alert sound information, from among a plurality of alert sounds stored in the user terminal 30 and output the selected alert sound.

Figure 8:
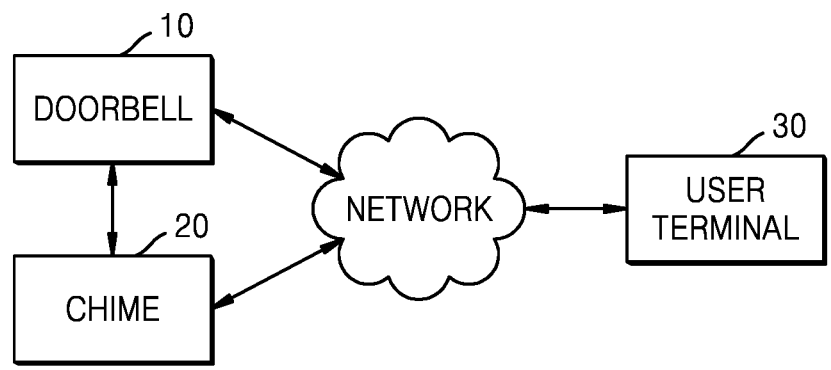
FIGS. 8 through 10 are diagrams illustrating a security system according to another exemplary embodiment.
Figure 9:
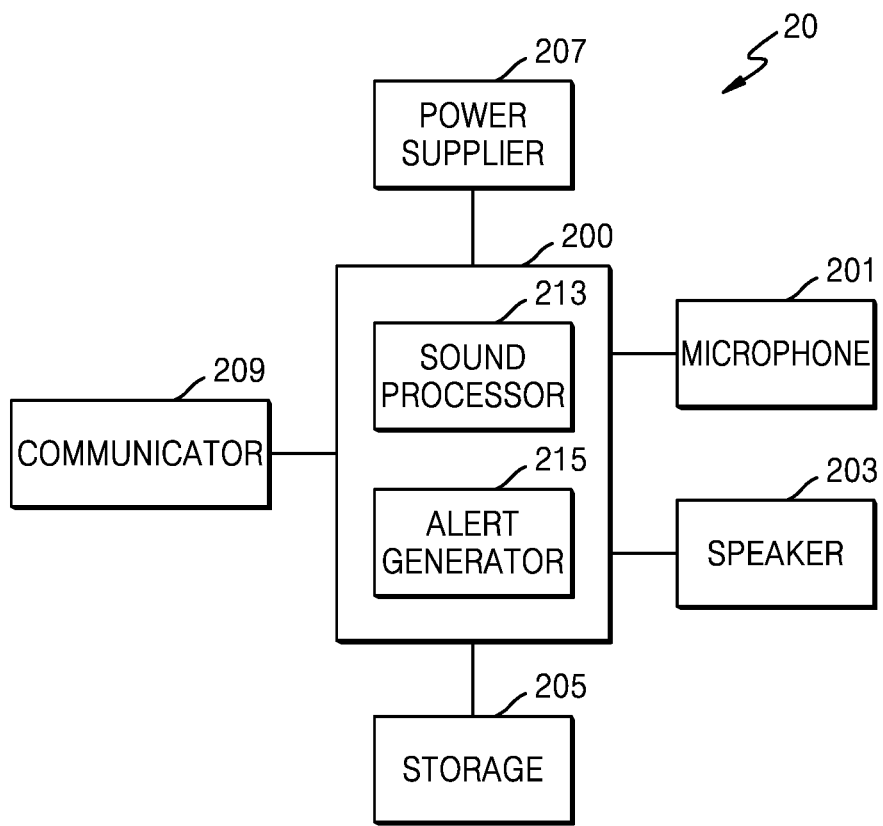
Figure 10:
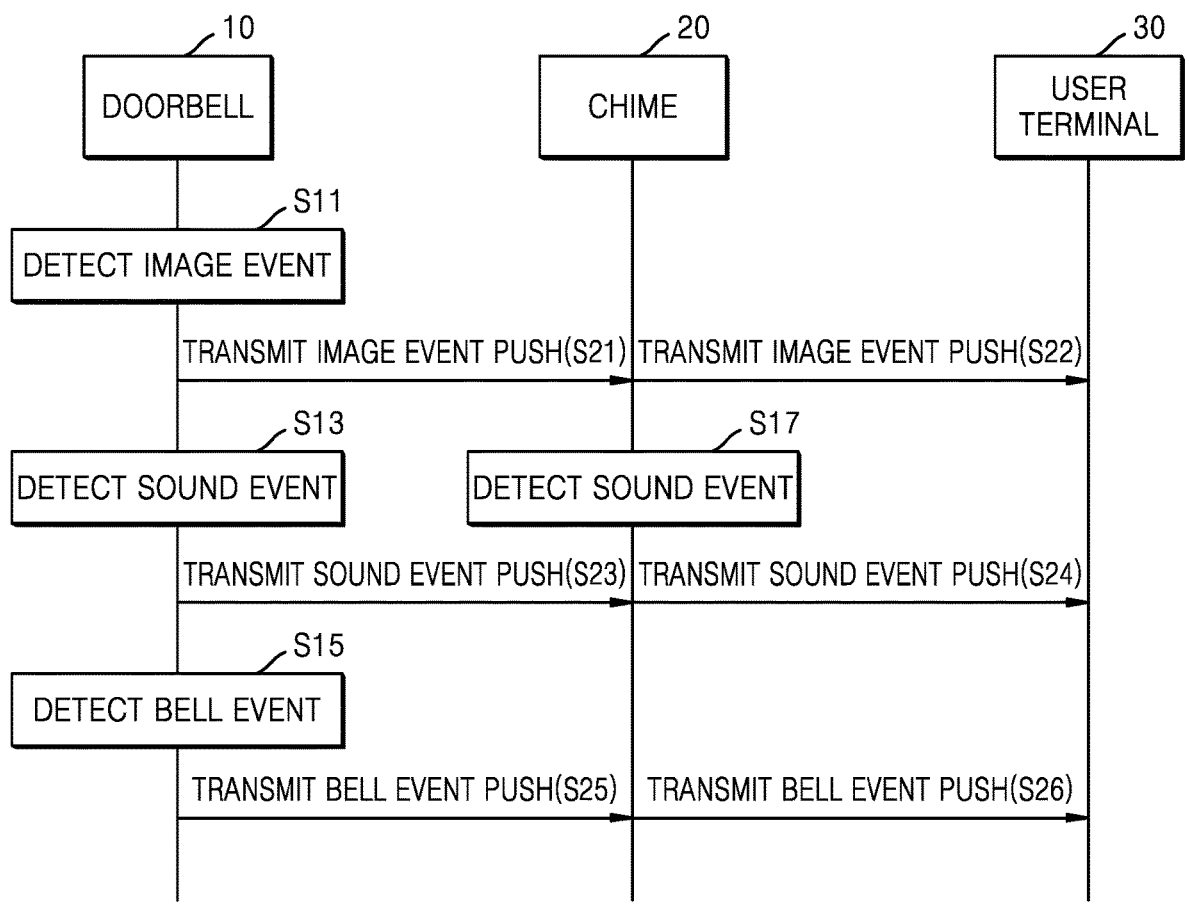

FIGS. 8 through 10 are diagrams of a security system according to another exemplary embodiment.

Referring to FIG. 8, the security system may include a doorbell system including a doorbell 10, a chime 20, and a user terminal 30. The doorbell 10 and the user terminal 30 illustrated in FIG. 8 may be the same doorbell 10 and user terminal 30 illustrated in FIGS. 1, 2, 6 and 7. The doorbell 10 may be connected to the chime 20 by wire or wirelessly, and the doorbell 10 and the chime 20 may communicate with the user terminal 30 through a network. The following will focus on a difference from the above embodiments, and a detailed explanation of the same elements will be omitted.

The doorbell 10 may be provided outside a building, and the chime 20 may be provided inside the building. When a visitor presses the button 102 (see FIG. 1) provided in a housing of the doorbell 10, the chime 20 may output an alert sound and a user who is located inside the building may check and identify the visitor by using the alert sound.

The chime 20 according to an embodiment may receive an image event push and/or a sound event push from the doorbell 10. The chime 20 may transmit the received image event push and/or sound event push to the user terminal 30.

The chime 20 may receive object information corresponding to the image event push and/or the sound event push from the doorbell 10, and may select and output an alert sound corresponding to the object information. Alternatively, the chime 20 may receive alert sound information corresponding to the image event push and/or the sound event push from the doorbell 10, and may select and output an alert sound, corresponding to the alert sound information, from among a plurality of alert sounds stored in the chime 20. Alternatively, the chime 20 may receive from the doorbell 10 an alert sound corresponding to the image event push and/or the sound event push, and may output the received alert sound.

Referring to FIG. 9, the chime 20 according to an exemplary embodiment may include a processor 200, a microphone 201, a speaker 203, a storage 205, a power supplier 207, and a communication interface 209.

The microphone 201 may be embedded in a housing of the chime 20 or may be provided inside a door, and may detect an indoor sound.

The speaker 203 may be embedded in the housing of the chime 20 or may be provided inside the door, and may output a sound.

The storage 205 may store a program for processing and controlling the processor 200, and may store data (e.g., a sound source or a sound) that is input or output. The storage 205 may include an external storage medium such as an SD card and/or an internal memory. The storage 205 may include a web storage or a cloud server that performs a storage function on the Internet. The user may access to the storage 205 through the user terminal 30, and may search for and reproduce (replay) a stored sound.

The storage 205 may store an alert sound and/or alert sound information according to each object. Objects may include registrants and non-registrants of the chime 20 and/or the doorbell 10. The storage 205 may store a sound of a sound event.

The power supplier 207 may convert AC or DC power applied from an external power source to power required to operate each element and may supply the converted power. The power supplier 207 may include an auxiliary power supplier such as a rechargeable battery.

The communication interface 209 may perform short-range wireless communication such as Zigbee, Bluetooth, RFID, NFC, or infrared communication, or mobile communication or wireless Internet communication such as 3G, 4G LTE, WiFi, Wibro, or Wimax. Also, the communication interface 209 may perform Sub-1 GHz band communication and/or wired communication. The communication interface 209 may be connected to the doorbell 10 and the user terminal 30 by using wired or wireless communication.

The processor 200 may include any number of hardware and/or software components that perform specific functions. For example, the processor 200 may refer to a hardware-implemented data processing device having circuitry that is physically structured to execute operations represented as code or instructions included in a program.

The processor 200 controls an overall operation of the chime 20, and transmits/receives control signals to/from elements to control operations of the elements or processes data. The processor 200 may include a sound processor 213 and an alert generator 215.

The sound processor 213 may include an audio codec, and may store and process the indoor sound received by the microphone 201 in the storage 205. The sound processor 213 may detect a sound event set by the user, for example, a case where a glass cracking sound, an alarm sound, a collision sound, a shout, a stream, a crying sound, or a sound greater than a threshold value is produced, from the received sound. The sound processor 213 may match a sound event detection time to each sound and store a matching result.

The alert generator 215 may select an alert sound, from among a plurality of alert sounds stored in the storage 205, when the sound processor 213 detects the sound event. The alert sound may be set to vary according to a type of the sound event.

The alert generator 215 may receive alert sound information from the doorbell 10, and may select an alert sound corresponding to the received alert sound information. The alert generator 215 may receive information about an identified object from the doorbell 10, and may select an alert sound corresponding to the received information about the identified object. The alert generator 215 may select an alert sound set to the identified object or an alert sound set to another object related to the identified object.

The alert sound selected by the alert generator 215 may be output to the outside through the speaker 103. Also, the alert generator 215 may transmit object information and/or alert sound information received from the doorbell 10 to the user terminal 30 at a remote place through the communication interface 209. The user terminal 30 may output a corresponding alert sound based on the received object information and/or alert sound information. Also, the alert generator 215 may select the corresponding alert sound based on the object information and/or the alert sound information received from the doorbell 10 and may transmit the selected alert sound to the user terminal 30 at the remote place through the communication interface 209. The user terminal 30 may output the received alert sound.

According to exemplary embodiments, since a different alert sound is set to each registrant, before the visitor presses the button 102, the user inside the building may individually know whether the visitor is a family member, a previous visitor, or a new visitor according to the different alert sound. Accordingly, the user may rapidly perform a follow-up action on the visitor.

Although not shown in FIG. 9, the chime 20 may further include various sensors such as a camera, a motion sensor, a gas sensor, a temperature sensor, and an illumination sensor.

Referring to FIG. 10, the doorbell 10 may be connected by wire or wirelessly to the chime 20 and/or the user terminal 30, and may communicate with the chime 20 and/or the user terminal 30.

In operation S11, the doorbell 10 may detect an image event from an image obtained by a camera. The doorbell 10 may detect a primary image event that detects a first object entering a first region of a surveillance region and a secondary image event that identifies a second object entering a second region of the surveillance region.

In operation S13, the doorbell 10 may detect a sound event from a sound obtained by a microphone.

When the image event is detected, in operation S21, the doorbell 10 may transmit an image event push to the chime 20. In operation S22, the doorbell 10 or the chime 20 receiving the image event push may transmit the image event push to the user terminal 30.

When the sound event is detected, in operation S23, the doorbell 10 may transmit a sound event push to the chime 20. In operation S17, the chime 20 may detect the sound event, separately from the doorbell 10. In operation S24, the doorbell 10 or the chime 20 receiving the sound event push from the doorbell 10 or detecting the sound event by itself may transmit the sound event push to the user terminal 30.

The doorbell 10 may transmit at least one of a corresponding image and alert sound information along with the image event push and/or the sound event push to the chime 20 and/or the user terminal 30. In another exemplary embodiment, the chime 20 may transmit at least one of an image received from the doorbell 10 and alert sound information corresponding to the image to the user terminal 30. The doorbell 10 may transmit at least one of a corresponding image and an alert sound corresponding to the corresponding image along with the image event push and/or the sound event push to the chime 20 and/or the user terminal 30. In still another embodiment, the chime 20 may transmit at least one of an image and an alert sound corresponding to the image received from the doorbell 10 to the user terminal 30.

The user terminal 30 may receive the image event push and/or the sound event push, and the user at the remote place may grasp a situation around the doorbell 10 based on the alert sound output by the user terminal 30 corresponding to the events.

Also, the chime 20 may receive the image event push and/or the sound event push, and the user inside the building may grasp the situation around the doorbell 10 based on the alert sound output to correspond to the event.

In operation S15, a bell event (button pressure event) is detected. In operation S25, the doorbell 10 may transmit a bell event push to the chime 20. In operation S26, the doorbell 10 or the chime 20 receiving the bell event push may transmit the bell event push to the user terminal 30.

The user inside the building may perform a video call and/or a voice call with the visitor in real time through a video phone connected to the chime 20. The user at the remote place may select an image mode and/or a sound mode in the user terminal 30, and may perform a video call and/or a voice call with the visitor in real time.

Although not shown in FIG. 10, the doorbell system may further include the server 50 (FIGS. 6 and 7). When the image event is detected, the doorbell 10 may transmit image event information to the chime 20 and/or the server 50. The image event information may include an event image, an event occurrence time, etc. The chime 20, instead of the doorbell 10, may transmit the image event information received from the doorbell 10 to the server 50.

When the sound event is detected, the doorbell 10 may transmit sound event information to the chime 20 and/or the server 50. The sound event information may include a sound detected in the sound event, an image obtained when the sound event is detected, an event occurrence time, etc. The chime 20, instead of the doorbell 10, may transmit the sound event information received from the doorbell 10 to the server 50.

The server 50 may generate situation information by collecting and analyzing the image event information and/or the sound event information. The server 50 may transmit the situation information to the user terminal 30. The situation information may be provided as a message (text) suitable for the situation and including words, phrases, and sentences. For example, the server 50 may determine whether a behavior is an abnormal behavior by analyzing a behavior pattern and/or a movement of the first object detected in the first region or the second object identified in the second region.

The user terminal 30 may request the server 50 for the image event information and/or the sound event information corresponding to the received situation information. The server 50 may provide the event information to the user terminal 30 in response to an event information request.

A doorbell system and a security method thereof according to the above embodiments may reduce visitor detection errors by applying a different image analysis algorithm according to a position of a visitor, and may provide detailed information about the visitor to a user before the visitor presses a bell button.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units (collectively "components" in this paragraph) represented by a block in the drawings (e.g., image processor 111, sound processor 113, and alert generator 115 in FIG. 4) may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While the inventive concept has been particularly shown and described with reference to exemplary embodiments thereof, these embodiments have merely been used to explain the inventive concept and should not be construed as limiting the scope of the inventive concept as defined by the claims. The exemplary embodiments should be considered in a descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A doorbell system comprising a doorbell which comprises:
   a housing;
   a bell;
   a camera in the housing of the doorbell;
   a processor in the housing of the doorbell, including an image processor, and an alert generator, wherein the camera is configured to obtain at least one of a first image of a first object entering a predetermined first region at a first distance from the doorbell and at least one of a second image of a second object entering a predetermined second region at a second distance from the doorbell, the second region being closer to the doorbell than the first region;
   the image processor configured to detect the first object from the first image, and identify the first object from the second image;
   the alert generator configured to select and transmit to a user terminal an alert sound or alert sound information corresponding to the identified first object;
   wherein the image processor determines, based on a position of the first object, whether to apply either one of a first image analysis algorithm or a second image analysis algorithm;
   wherein the image processor detects the first object by applying the first image analysis algorithm to the first image of the predetermined first region at the first distance from the doorbell, and the image processor identifies the first object by applying the second image analysis algorithm to the second image of the predetermined second region at the second distance from the doorbell in real-time;
   wherein the first image analysis algorithm uses a human detection algorithm and the second image analysis algorithm uses a facial recognition algorithm;
   and wherein the alert generator transmits, to the user terminal, the alert sound assigned to the first object from among the plurality of alert sounds, or the alert sound information indicating characteristics of a first alert sound, when the first object is identified in the second region, and does not transmit, to the user terminal, the alert sound or the alert sound information, when the first object is detected only in the first region.

2. The doorbell system of claim 1, wherein
   the first region includes a distance range of 5 meters to 10 meters and the second region includes a distance range of 3 meters to 5 meters.

3. The doorbell system of claim 1, wherein the doorbell further comprises a storage configured to store at least one of the first image from which the first object is detected and the second image from which the first object is identified.

4. The doorbell system of claim 1, wherein the doorbell further comprises:
   a microphone; and
   a sound processor configured to detect a sound event from a sound received by the microphone, wherein the alert generator is further configured to select and transmit to the user terminal the alert sound or the alert sound information corresponding to the detected sound event.

5. The doorbell system of claim 4, wherein the doorbell further comprises a storage configured to store an event image obtained by the camera at a time when the sound event occurs,
wherein the alert generator is further configured to transmit the obtained event image to the user terminal.

6. The doorbell system of claim 1, wherein the image processor collects results of the detection and the identification as statistics and adjusts R1 and R2 based on the statistics.

7. The doorbell system of claim 1, wherein the alert generator is further configured to select and transmit to the user terminal an alert sound set to a third object related to the first object.

8. The doorbell system of claim 1, further comprising-a server configured to receive, from the doorbell, event information according to the detection of the first object and the identification of the first object, and determine whether a behavior is an abnormal behavior by analyzing behavior patterns of the first object,
wherein the event information comprises at least one of the first image of the first object and a sound related to the first object captured when the first object is detected and/or at least one of the second image of the first object and a sound related to the first object when the first object is identified.

9. The doorbell system of claim 8, wherein the server is further configured to generate situation information based on the event information and transmit the situation information to the user terminal, and transmit the event information corresponding to the situation information to the user terminal in response to a request by the user terminal, and
wherein the situation information comprises a result of analyzing a behavior of the first object.

10. The doorbell system of claim 1, wherein the alert generator is further configured to transmit to the user terminal object information about the identified first object.

11. A security method of a doorbell system comprising a doorbell, a server, and a user terminal, the security method comprising:
detecting by the doorbell, a first object entering a first region, from an image obtained by capturing the first object;
identifying by the doorbell, a second object entering a second region closer to the doorbell than the first region, from an image obtained by capturing the first object; and
outputting by the doorbell, an alert sound or alert sound information corresponding to the identified first object;
obtaining by a camera, in the housing of the doorbell, at least one of a first image of a first object entering a predetermined first region at a first distance measured from the doorbell to the first object,
obtaining by the camera, at least one of a second image of the first object entering a predetermined second region at a second distance measured from the doorbell to the first object, wherein the second region is closer to the doorbell than the first region, wherein a processor, in the housing of the doorbell, includes an image processor and an alert generator;
determining, by the image processor, based on a position of the first object, whether to apply either one of a first image analysis algorithm or a second image analysis algorithm, wherein the first image analysis algorithm uses a human detection algorithm and the second image analysis algorithm uses a facial recognition algorithm;
detecting by the image processor, the first object from the first image by applying the first image analysis algorithm to the first image of the predetermined first region at the first distance from the doorbell;
identifying by the image processor, the first object from the second image by applying the second image analysis algorithm to the second image of the predetermined second region at the first distance from the doorbell, in real-time;
selecting and transmitting, by the alert generator, to the user terminal the alert sound assigned to the first object from among a plurality of alert sounds, or the alert sound information indicating characteristics of the first alert sound, when the first object is identified in the second region; and
not transmitting, by the alert generator, to the user terminal the alert sound, or the alert sound information, when the first object is detected only in the first region.

12. The security method of claim 11, wherein the image processor collects results of the detection and the identification as statistics and adjusts the first distance and the second distance based on the statistics.

13. The security method of claim 11, wherein the alert sound information indicates characteristics of the alert sound.

14. The security method of claim 13, wherein the characteristics of the alert sound comprises at least one of a name, an identifier, and an index of the alert sound previously known between the doorbell and the user terminal.

15. A doorbell system comprising:
a user terminal;
a doorbell comprising:
a housing;
a bell;
a camera, in the housing of the doorbell, obtaining at least one of an image of a first object entering a predetermined first region at a distance R1, wherein R1 is a radius measured from the doorbell to the distance of the first object in the first region, and the camera obtaining at least one of an image of a second object entering a predetermined second region at a distance R2, wherein R2 is a radius measured from the doorbell to the entrance of the second object in the second region, wherein the second region is closer to the doorbell than the first region;
a processor, in the housing of the doorbell, including an image processor and an alert generator;
an image processor configured to detect the first object from the image of the first object, and identify the second object from the image of the second object;
and the alert generator configured to select and transmit to the user terminal an alert sound or alert sound information corresponding to the identified second object;
a server;
wherein the image processor determines, based on a position of the first object or the second object, whether to apply either one of a first image analysis algorithm or a second image analysis algorithm; and
wherein the first image analysis algorithm uses a human detection algorithm and the second image analysis algorithm uses a facial recognition algorithm.

16. The doorbell system of claim 15,
where in the image processor collects results of the detection and the identification as statistics and adjusts R1 and R2 based on the statistics.

* * * * *